US007519902B1

(12) United States Patent
Kraft et al.

(10) Patent No.: US 7,519,902 B1
(45) Date of Patent: Apr. 14, 2009

(54) SYSTEM AND METHOD FOR ENHANCED BROWSER-BASED WEB CRAWLING

(75) Inventors: Reiner Kraft, Gilroy, CA (US); Jussi P. Myllymaki, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 1541 days.

(21) Appl. No.: 09/607,370

(22) Filed: Jun. 30, 2000

(51) Int. Cl.
*G06N 3/00* (2006.01)
(52) U.S. Cl. .................................................... 715/234
(58) Field of Classification Search ............... 715/501.1, 715/500, 513, 511, 526, 523, 517, 530, 234, 715/243, 254; 709/225; 707/104.1
See application file for complete search history.

(56) References Cited

U.S. PATENT DOCUMENTS

| | | | | | |
|---|---|---|---|---|---|
| 5,892,908 | A | * | 4/1999 | Hughes et al. | 709/250 |
| 5,983,247 | A | * | 11/1999 | Yamanaka et al. | 715/526 |
| 6,026,409 | A | * | 2/2000 | Blumenthal | 707/104.1 |
| 6,029,182 | A | * | 2/2000 | Nehab et al. | 715/523 |
| 6,105,042 | A | * | 8/2000 | Aganovic et al. | 715/500 |
| 6,145,003 | A | * | 11/2000 | Sanu et al. | 709/225 |
| 6,161,114 | A | * | 12/2000 | King et al. | 715/517 |
| 6,199,081 | B1 | * | 3/2001 | Meyerzon et al. | 715/513 |
| 6,249,794 | B1 | * | 6/2001 | Raman | 715/500 |
| 6,289,342 | B1 | * | 9/2001 | Lawrence et al. | 707/7 |
| 6,493,702 | B1 | * | 12/2002 | Adar et al. | 707/3 |
| 6,523,022 | B1 | * | 2/2003 | Hobbs | 707/3 |
| 6,638,314 | B1 | * | 10/2003 | Meyerzon et al. | 715/513 |
| 6,874,009 | B1 | * | 3/2005 | Tuli | 709/203 |
| 7,194,678 | B1 | * | 3/2007 | Koike et al. | 715/511 |

\* cited by examiner

*Primary Examiner*—Stephen S Hong
*Assistant Examiner*—Kyle R Stork
(74) *Attorney, Agent, or Firm*—Leonard T. Guzman; Jon A. Gibbons; Fleit Gibbons Gutman Bongini & Bianco P.L.

(57) ABSTRACT

This invention pioneers an enhanced crawling mechanism and technique called "Enhanced Browser Based Web Crawling". It permits the fault-tolerant gathering of dynamic data documents on the World Wide Web (WWW). The Enhanced Browser Based Web Crawler technology of this invention is implemented by incorporating the intricate functionality of a web browser into the crawler engine so that documents are properly analyzed. Essentially, the Enhanced Browser Based Crawler acts similarly to a web browser after retrieving the initially requested document. It then loads additional or included documents as needed or required (e.g. inlineframes, frames, images, applets, audio, video, or equivalents.). The Crawler then executes client side script or code and produces the final HTML markup. This final HTML markup is ordinarily used for the rendering for user presentation process. However, unlike a web browser this invention does not render the composed document for viewing purposes. Rather it analyzes or summarizes it, thereby extracting valuable metadata and other important information contained within the document. Also, this invention introduces the integration of optical character recognition (OCR) techniques into the crawler architecture. The reason for this is to enable the web crawler summarization process to properly summarize image content (e.g. GIF, JPEG or an equivalent) without errors.

13 Claims, 9 Drawing Sheets

Fig. 2
Web Crawling Functional Overview

Fig. 3a System Architecture for Enhanced Browser-BasedCrawler

Fig. 3b

Enhanced Browser-Based Web Crawling Functional Overview

Fig.4

Pool Manager Operation

Page Renderer Operation

Page Extractor Operation

Page Summarizer Operation

SYSTEM AND METHOD FOR ENHANCED BROWSER-BASED WEB CRAWLING

PARTIAL WAIVER OF COPYRIGHT

All of the material in this patent application is subject to copyright protection under the copyright laws of the United States and of other countries. As of the first effective filing date of the present application, this material is protected as unpublished material. However, permission to copy this material is hereby granted to the extent that the copyright owner has no objection to the facsimile reproduction by anyone of the patent documentation or patent disclosure, as it appears in the United States Patent and Trademark Office patent file or records, but otherwise reserves all copyright rights whatsoever.

CROSS-REFERENCE TO RELATED APPLICATIONS

Not Applicable

FIELD OF THE INVENTION

This invention relates to Internet Search Technology and E-Commerce and more particularly to an improved method and apparatus for web crawling.

BACKGROUND OF THE INVENTION

Figure 1:
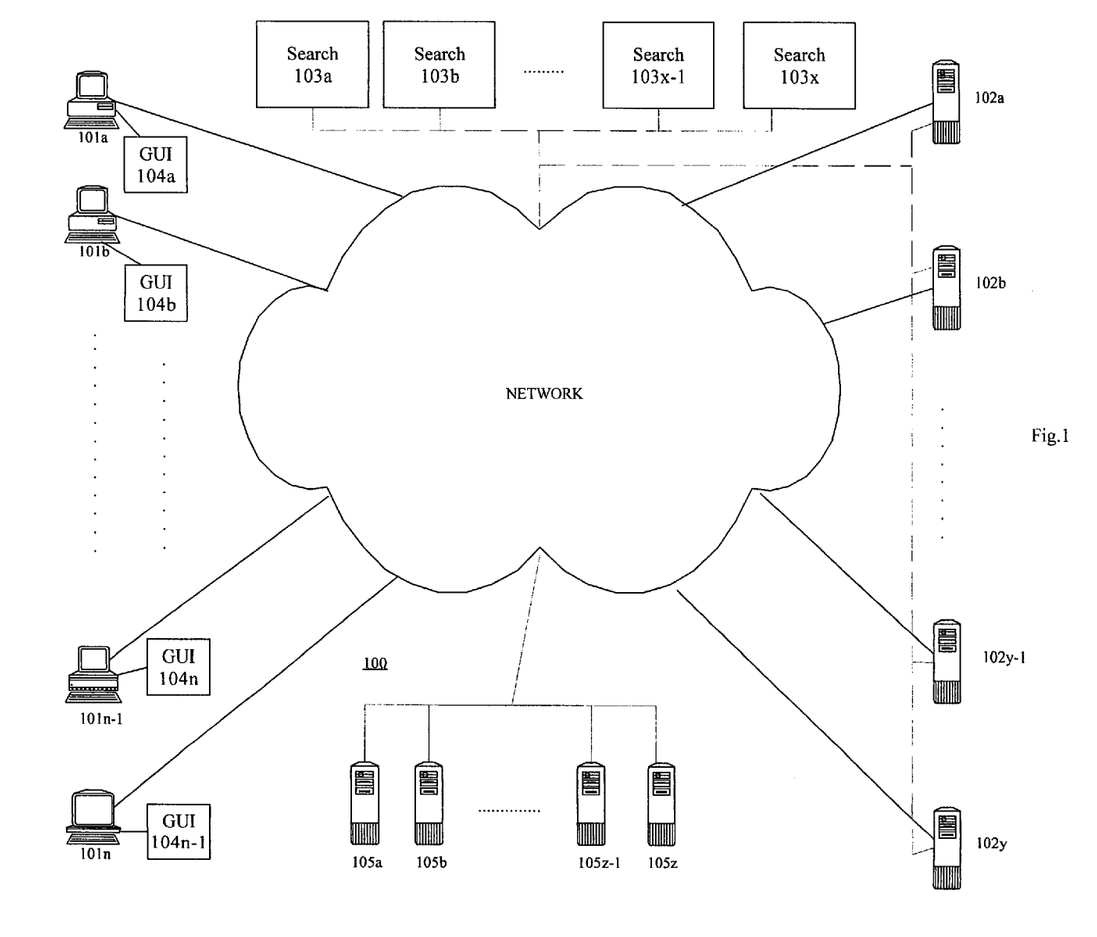
FIG. 1 is a system level overview of a typical information processing network within which the present invention may be practiced.

Database systems store enormous amounts of information that can be accessed by users for identification and retrieval of valuable documents that contain data, text, audio and video information. A typical example of a database system 100 is shown in FIG. 1. Information processing units 101a to 101n can be any of the following: personal computers (DOS, WINDOWS or Macintosh, Linux machines), workstations, a client, a dumb terminal or equivalent. Hub processing units 102a to 102y can be any of the following: a server, a master, a database controller or equivalent. Network (100) can be any of the following: a token ring network, a star network, a telecommunication switching network, a local area network (LAN), a wide area network (WAN), a corporate intranet, the Internet or equivalent. Information processing units 101a to 101n are in communication with hub processing units 102a to 102y via network 100. The sharing of data across network 100 is accomplished by computer search programs 103a to 103x operating in conjunction with the hub processing units 102a to 102y. The search programs can be located on the hub processing units themselves or on another processing units that are not shown. In addition, a user employs a graphical user interface (GUI) 104a to 104n that permits him or her to submit search queries across network 100 to the hub processing units.

Upon reception of the search query, the hub processing units forward the request to the search programs 103a to 103x for completion of the transaction. As is well known, search programs provide Boolean Operators (AND, OR NOT) to help build more sophisticated queries in order to narrow down the search result set. These Boolean Operators are used to provide the various permutations to the search programs 103a to 103x which uses these to locate pertinent documents. Once in possession of the search query, the search programs compare the requested search parameters against documents stored in databases 105a to 105z. Finding words or phrases that compare favorably with the search query, the search programs return a list of relevant documents to the information processing units 101a to 101n as well as library information such as type of document, location and highlighted words or phrases indicating the flags that caused the search program to retrieve the particular document. Finally, the search results are loaded into the graphical user interface GUI 104a to 104n for the user's review.

The search programs 103a to 103x used to return the search results in FIG. 1 are commonly referred to as "web crawlers". Today's web crawling methodologies are already able to retrieve heterogeneous, static content from the World Wide Web (WWW). However, as more and more designers use dynamically generated content in their web-based documents, existing crawling techniques are not always capable of retrieving the data correctly. Known Enhanced Crawling architectures are able to simulate user interaction; thus, these enable automatic crawling of web sites that dynamically generate their data and associate data with session information.

Figure 2:
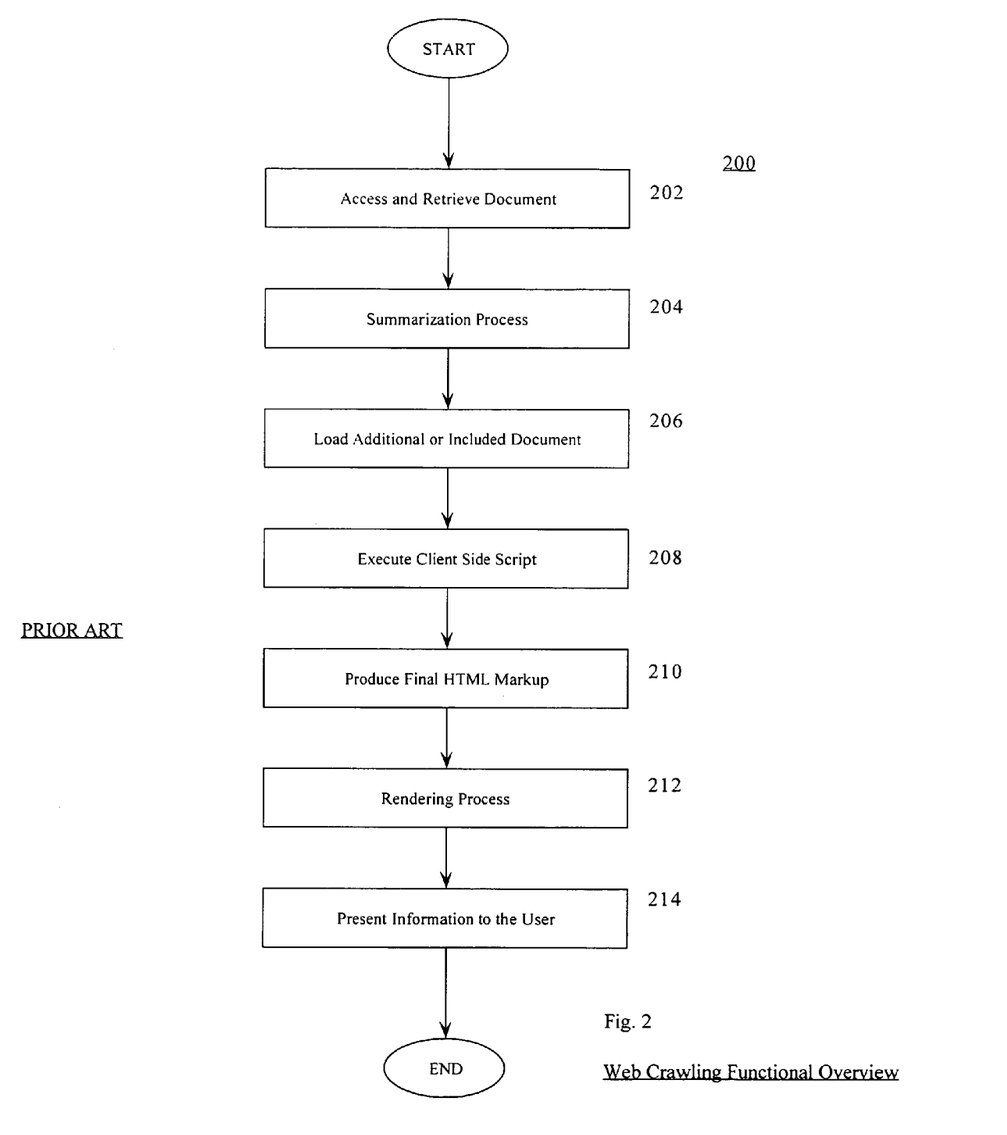
FIG. 2 is a flow diagram that illustrates the web crawling and web browsing process found in the prior art.

Referring now to the flow diagram 200 of FIG. 2, a typical web crawler performs two main operations in order to execute the crawling process; namely, the access—retrieval of a document (202) and then the analysis phase of the document, also called the summarization process (204). Whereas today's web crawler might be able to access a dynamically generated document correctly (e.g., a document generated through Active Server Pages, Perl Script or an equivalent), the summarization process will fail or produce flawed results if the document itself contains executable client side software code. The reason for this is that the client side software code (e.g., JavaScript, VBScript, or equivalent) is targeted to be executed and interpreted within a web browser's scripting engine. Eventually the code will be replaced with content, or the code produces content. Web designers often make use of this feature to dynamically create content on the client side; examples of this can include computation results which are originated based on some user input, or specific text based on the client's web browser version used or some other such equivalent. More generally, dynamic documents rely on a web browser's capabilities to:

a) retrieve additional documents (206) as needed (frames, in-line images, audio, video, applets, or equivalents) or required;
b) execute client side script (208) and code (JavaScript or equivalents);
c) furnish a fault tolerant HTML filter to recognize various HTML standards and interpret HTML markup errors; unscramble content that a web designer has purposefully scrambled in order to thwart crawling and other programmatic analysis methods; thereby produce a final HTML markup (210); and
e) integrate all these previously obtained results to render (212) the document for presentation to a user (214).

As one can see the information unit 101a to 101n side web browsing 104a to 104n process can become very complicated and convoluted. That's the reason why it's not a trivial task to implement a decent web browser. Further, there are additional problems involved in this implementation. As an example, a web browser has to achieve fault tolerance in regard to the underlying HTML used to create a document. First, there are many different HTML versions and standards currently available. Second, human error is introduced into the document when individuals do not correctly compose HTML markup. They forget brackets, use the wrong syntax, arguments, parameters or other such errors that necessitate a fault-tolerant browser. Therefore, there is a need for a fault-tolerant web crawler that does not fail when summarizing dynamic documents.

Further, today's web designers often make intensive use of images and image maps to represent text data in documents. Some of these documents consist only of images and the images themselves contain all the textual data and other information in the document. However, standard web crawlers will not be able to summarize such a document. Therefore, there is a need for a web crawler that can interpret and summarize textual and other information contained within the body of a web-based image document.

In summary, a web browser has to execute a complicated algorithmic process in order to eliminate the problems previously described; this complex algorithmic process enables the browser to present and render a document in the manner that the web document composer intended it to be displayed. A web browser's functionality is similar to that of a multi-tasking management component which has to coordinate several tasks to yield an effective end product. The web browser must coalesce information from a variety of sources to produce the final HTML code which will be rendered and displayed.

SUMMARY OF THE INVENTION

This invention pioneers an enhanced crawling mechanism and technique called "Enhanced Browser Based Web Crawling". It permits the fault-tolerant gathering of dynamic data documents on the World Wide Web (WWW). The Enhanced Browser Based Web Crawler technology of this invention is implemented by incorporating the intricate functionality of a web browser into the crawler engine so that documents are properly analyzed. Essentially, the Enhanced Browser Based Crawler acts similarly to a web browser after retrieving the initially requested document. It then loads additional or included documents as needed or required (e.g., inline-frames, frames, images, applets, audio, video, or equivalents). The Crawler then executes client side script or code and produces the final HTML markup. This final HTML markup is ordinarily used for the rendering for user presentation process. However, unlike a web browser this invention does not render the composed document for viewing purposes. Rather it analyzes or summarizes it, thereby extracting valuable metadata and other important information contained within the document.

In another embodiment, this invention introduces the integration of Optical Character Recognition (OCR) techniques into the crawler architecture. The reason for this is to enable the web crawler summarization process to properly summarize image content (e.g., GIF, JPEG or an equivalent) without errors. Since today's web designers often make intensive use of images and image maps to represent textual and other data in documents, it is imperative that a web crawler be capable of retrieving and summarizing images and image maps that contain textual or other data types in a fault-free manner.

Using the Enhanced Browser Based Crawler of this invention to enhance existing document gathering and analysis introduces significant advantages over the prior art. First, the quality of the extracted metadata is dramatically improved. This is due to the fact that the summarization of a document is based on the whole and complete document as it was designed by the document's author; the static heterogenous data as well as the problematic dynamic data is processed fault-free and integrated into the metadata. A standard web crawler is not able to compose this type of highly dynamic and distributed document that includes dynamic information such as client side script, applets, or their equivalents. Secondly, the integration of optical character recognition (OCR) techniques into the document analysis and summarization process enables the retrieval of textual data from images or image maps. This text can be analyzed and added to the document summary.

Overall the enhanced browser crawling technique described in the invention produces a higher quality of metadata, because it can integrate and analyze information which cannot be obtained from standard crawling techniques. As a result, a search engine provider utilizing this invention, is able to provide a virtually fault-free search service; fault-free from the perspective of the underlying built-in software functional failures previously described with regards to the prior art crawlers.

In another embodiment, the crawler is integrated into a Grandcentral station framework as a prototype.

BRIEF DESCRIPTION OF THE FIGURES

The subject matter which is regarded as the invention is particularly pointed out and distinctly claimed in the claims at the conclusion of the specification. The foregoing and other objects, features, and advantages of the invention will be apparent from the following detailed description taken in conjunction with the accompanying drawings.

DETAILED DESCRIPTION OF THE PREFERRED EMBODIMENTS

It is important to note that these embodiments are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in the plural and vice versa with no loss of generality.

In the drawing like numerals refer to like parts through several views.

GLOSSARY OF TERMS USED IN THIS DISCLOSURE

Crawler—A program that automatically explores the World Wide Web by retrieving a document and recursively retrieving some or all the documents that are linked to it. The crawler visits web sites and reads their pages and other information in order to create entries for a search engine index. The major search engines on the Web all have such a program, which is also known as a "crawler" or a "bot." Crawlers or spiders are typically programmed to visit sites that have been submitted by their owners as new or updated. Entire sites or specific pages can be selectively visited and indexed. Spiders are called spiders because they usually visit many sites in parallel at the same time, their "legs" spanning a large area of the "web." Spiders can crawl through a site's pages in several ways. One way is to follow all the hypertext links in each page until all the pages have been read. The spider for the AltaVista search engine and its Web site is called Scooter. Scooter adheres to the rules of politeness for Web spiders that are specified in the Standard for Robot Exclusion (SRE). It asks each server which files should be excluded from being indexed. It does not (or can not) go through firewalls. And it uses a special algorithm for waiting between successive server requests so that it doesn't affect response time for other users.

Dictionary—A database of context-related terms.

HTML (Hypertext Markup Language)—A standard language for attaching presentation and linking attributes to informational content within documents. During a document authoring stage, HTML "tags" are embedded within the informational content of the document. When the web document (or "HTML document") is subsequently transmitted by a web server to a web browser, the tags are interpreted by the browser and used to parse and display the document. In addition to specifying how the web browser is to display the document, HTML tags can be used to create hyperlinks to other web documents.

Internet—A collection of interconnected public and private computer networks that are linked together with routers by a set of standards protocols to form a global, distributed network.

Search engine—A remotely accessible World Wide Web tool that allows users to conduct keyword searches for information on the Internet. Typically, a search engine uses a spider (also called a "crawler" or a "bot") that goes to every page or representative pages on every Web site that wants to be searchable and reads it, using hypertext links on each page to discover and read a site's other pages. The spider creates a huge index (sometimes called a "catalog") from the pages that have been read. See crawler definition above.

Server—A software program or a computer that responds to requests from a web browser by returning ("serving") web documents.

URL (Uniform Resource Locator)—A unique address that fully specifies the location of a content object on the Internet. The general format of a URL is protocol:// server-address/path/filename.

Web browser—A software program that allows users to request and read hypertext documents. The browser gives some means of viewing the contents of web documents and of navigating from one document to another. Popular examples are Microsoft's Internet Explorer or Netscape's Navigator.

Web document or page—A collection of data available on the World Wide Web and identified by a URL. In the simplest, most common case, a web page is a file written in HTML and stored on a web server. It is possible for the server to generate pages dynamically in response to a request from the user. A web page can be in any format that the browser or a helper application can display. The format is transmitted as part of the headers of the response as a MIME type, e.g. "text/html", "image/gif". An HTML web page will typically refer to other web pages and Internet resources by including hypertext links.

Web Site—A database or other collection of inter-linked hypertext documents ("web documents" or "web pages") and associated data entities, which is accessible via a computer network, and which forms part of a larger, distributed informational system such as the WWW. In general, a web site corresponds to a particular Internet domain name, and includes the content of a particular organization. Other types of web sites may include, for example, a hypertext database of a corporate "intranet" (i.e., an internal network which uses standard Internet protocols), or a site of a hypertext system that uses document retrieval protocols other than those of the WWW.

World Wide Web (WWW): An Internet client—server hypertext distributed information retrieval system.

Exemplary Embodiment

System Architecture for Enhanced Browser Based Crawler

Figure 3A:
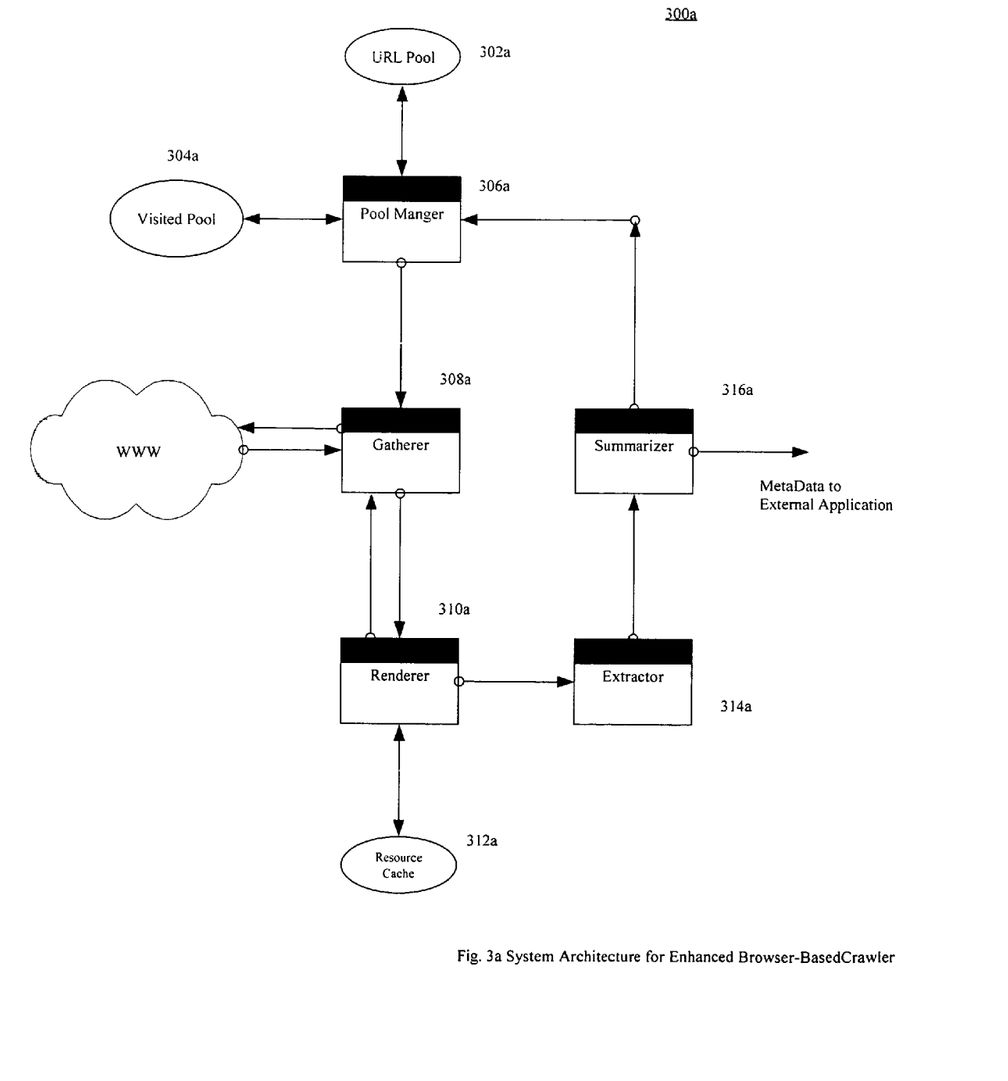
FIG. 3a is a block diagram that depicts the system architecture for an enhanced browser based crawler.

The enhanced crawler will be described with the use of FIGS. 3 to 8 to describe the improved crawler services. The enhanced crawler is depicted in FIG. 3a and it comprises the following architecture:
1) URL Pool—302a
2) Visited Pool—304a
3) Pool Manager—306a
4) Page Gatherer—308a
5) Page Renderer—310a
6) Resource Cache—312a
7) Page Extractor—314a
8) Page Summarizer—316a

Figure 3B:
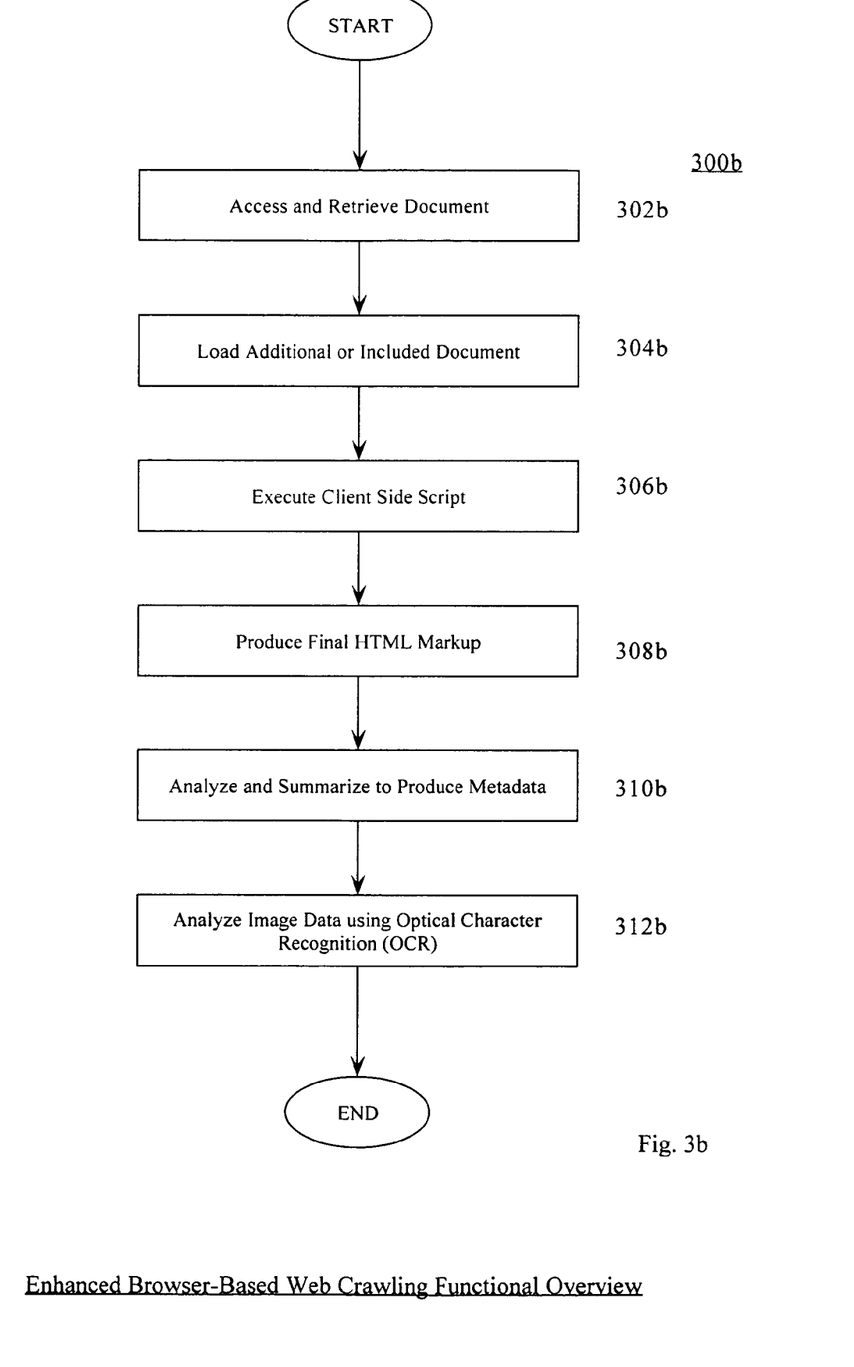
FIG. 3b is a flow diagram that illustrates the enhanced browser based web crawling functional overview.

FIG. 3b is a flow diagram that illustrates an overview of the processing steps executed in accordance with the principles of this invention demonstrating the enhanced web crawling services of this invention. Essentially, the Enhanced Browser Based Crawler acts similarly to a web browser after retrieving the initially requested document (302b). It then loads additional or included documents (304b) as needed or required (e.g. inline-frames, frames, images, applets, audio, video, or equivalents). The Crawler then executes client side script or code (306b) and produces the final HTML markup (308b). This final HTML markup is ordinarily used for the rendering for user presentation process. However, unlike a web browser this invention does not render the composed document for viewing purposes. Rather it analyzes or summarizes it (310b), thereby extracting valuable metadata and other important information contained within the document. Finally, image data including images and image map are analyzed using optical character recognition (OCR) techniques (312b).

The following is a detailed functional description of the individual components that comprise the system and method for enhanced browser-based web crawling.

URL Pool 302a

As in other crawlers, a URL list or "Pool" stores URLs that are yet to be crawled by the system. The pool is initialized with "seed URLs" that point to Web pages where crawling will begin. As pages are gathered from the Web, they are processed by the other components of this system. As new URLs are discovered by the Page Summarizer, they are given to the Pool Manager which inspects them, checking whether they exist in the Visited Pool, and if not, inserts them into the URL pool for subsequent crawling. URLs are removed from the URL Pool when they are scheduled for crawling by the Pool Manager. The crawler system is finished when the URL pool is empty and all other components are idle.

Visited Pool 304*a*

URLs that have been crawled are inserted into a Visited list or "Pool". This pool accumulates overtime and will eventually contain all URLs gathered by the crawler system.

Pool Manager 306*a*

Figure 4:
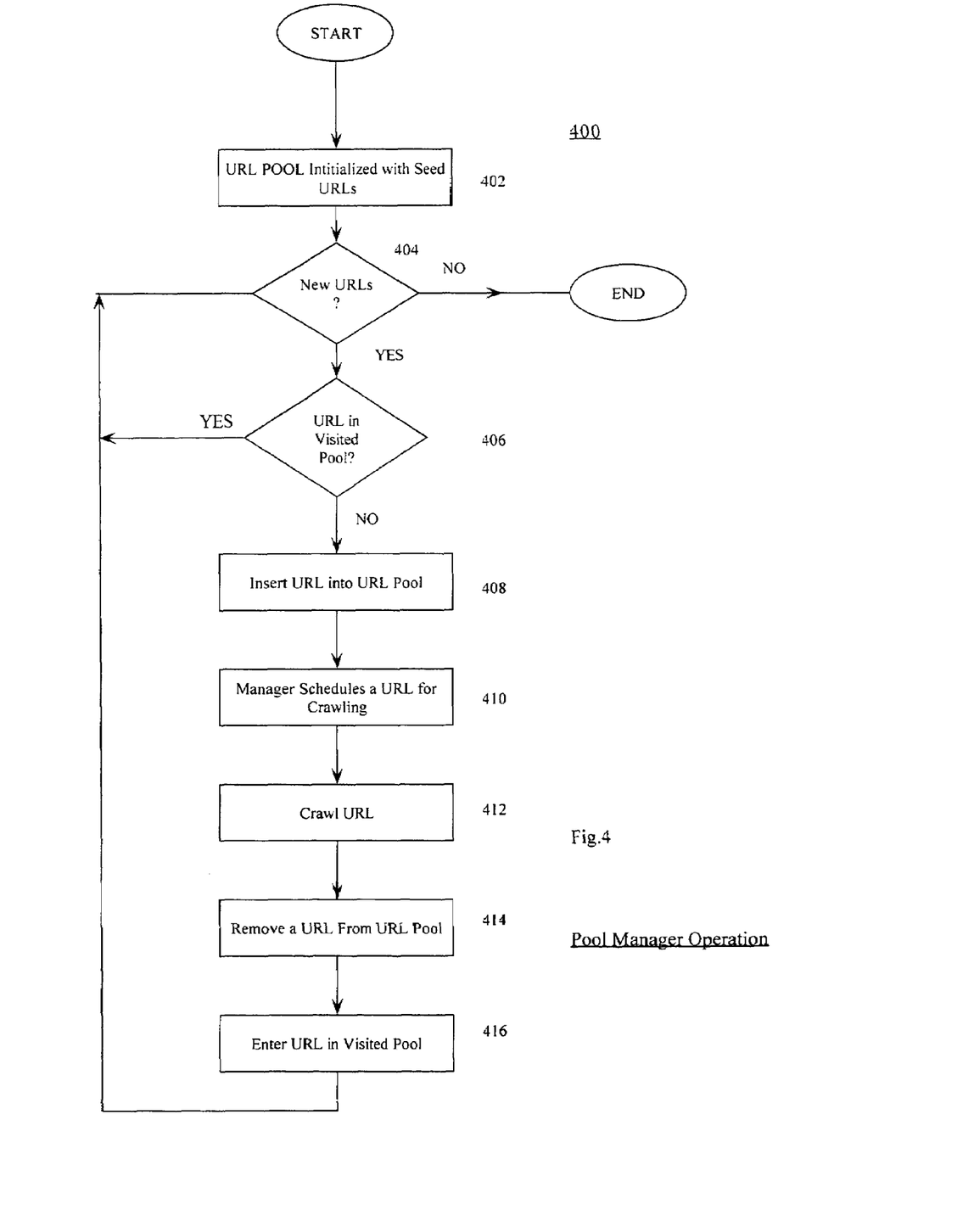
FIG. 4 is a flow diagram that illustrates the processing steps executed in a Pool Manager subroutine to control a visited pool and a URL pool.

FIG. 4 is a flow diagram that illustrates the processing steps executed in a Pool Manager subroutine to control a visited pool and a URL pool. The Pool Manager is responsible for maintaining the contents of the URL Pool 302*a* and the Visited Pool 304*a*. The URL Pool is initialized with seed URLs through the Pool Manager 402. As pages are gathered from the Web, they are processed by the other components of this system. As new URLs 404 are discovered by the Page Summarizer, they are given to the Pool Manager which inspects them, checking whether they exist in the Visited Pool 406, and if not, inserts them into the URL pool 408 for subsequent crawling. The Pool Manager schedules a URL for crawling 410 and then the URL is crawled at the scheduled time 412. The URL is removed from the URL Pool 414 by the Pool Manager subsequent to the crawling and entered into the Visited Pool 416. The crawler system is finished when the URL pool is empty and all other components are idle.

Page Gatherer 308*a*

Figure 5:
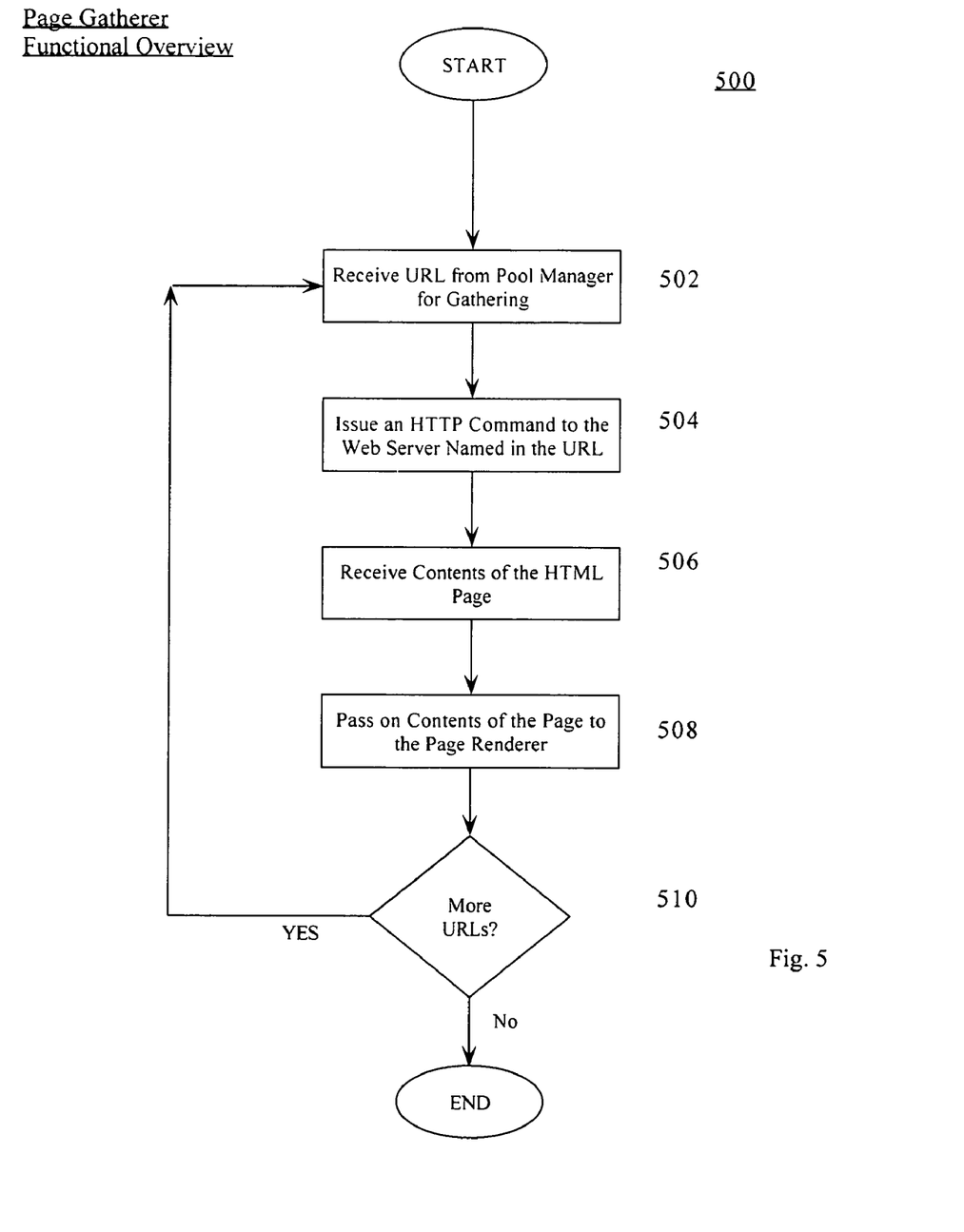
FIG. 5 is a flow diagram that illustrates the processing steps executed in a Page Gatherer subroutine to gather contents of HTML pages.

FIG. 5 is a flow diagram that illustrates the processing steps executed in a Page Gatherer subroutine to gather contents of HTML pages. The Pool Manager gives a URL to the Page Gatherer for gathering 502. The Page Gatherer issues an HTTP command to the Web server named in the URL 504 and subsequently receives the content of the HTML page 506. The contents of the page are passed on to the Page Renderer for rendering 508. A check is performed to see if there are more URLs that need to be gathered at 510; the process continues as long as there are URLs to be gathered.

Page Renderer 310*a*

Figure 6:
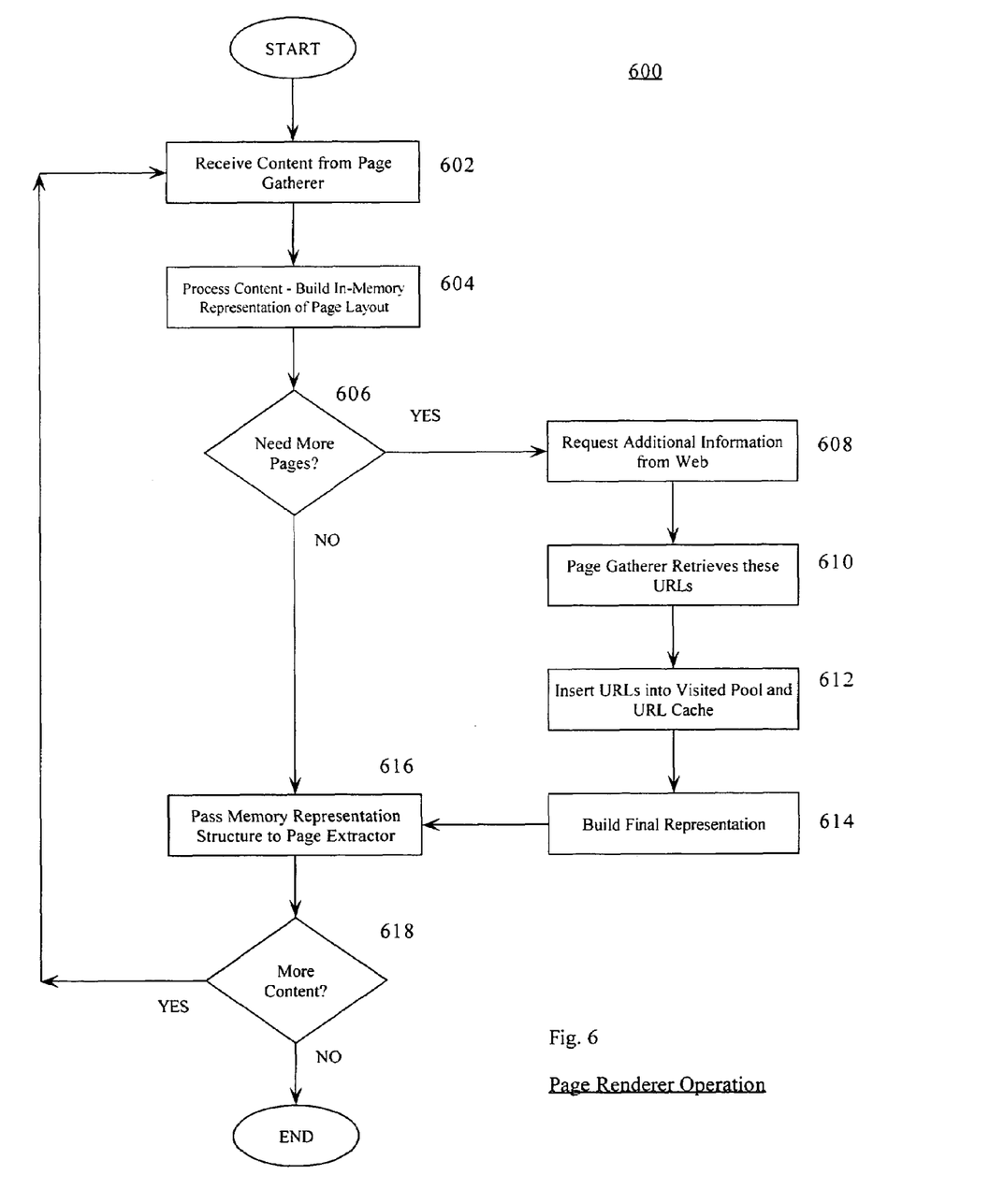
FIG. 6 is a flow diagram that illustrates the processing steps executed in a Page Renderer subroutine to create an in-memory representation of a HTML page layout.

FIG. 6 is a flow diagram that illustrates the processing steps executed in a Page Renderer subroutine to create an in-memory representation of a HTML page layout. The Page Renderer is a page processing engine that exists in a Web browser and is normally used for displaying a HTML page to the user. In the Enhanced Browser Based Crawler system, however, the Page Renderer is used as an intermediate component for extracting the contents of a HTML page. The enhanced crawler relies on the features of industrial-strength Page Renderers such as the one included in the publicly available Mozilla browser, also known as Netscape Navigator. These renderers implement several features that a crawler needs for effective data extraction, including:

Handling of HTML text (tables, paragraphs, lists, or equivalents);

Handling of inline GIF and JPEG graphics (buttons, banners, maps, or equivalents);

Execution of JavaScript code;

Processing of HTML frames;

Potentially, execution of Java applet code.

The Page Renderer receives the contents of a HTML page from the Page Gatherer 602. It processes the contents by building an in-memory representation 604 of the layout of the page on a would-be user interface. These memory structures would normally communicate to a user interface component information on the manner of laying out text and graphics on the page. However, in this Enhanced Browser Based Crawler system, the memory structures are passed on to the Page Extractor for processing 616 when no additional pages are needed for creation of the in-memory representation.

In the event more pages are needed 606 in order to build a full representation of the layout of a HTML page, the Page Renderer may have to request additional pages to be fetched from the Web 608. These additional pages can include child frames and in-line GIF and JPEG image files (and potentially Java applet code). These URL requests are given to the Page Gatherer which retrieves 610 them immediately. The visited URLs are inserted into the Visited Pool and the Resource Cache 612. Finally, a final representation is constructed 614 and passed to the page extractor 616.

Resource Cache 312*a*

The Resource Cache stores a copy of each child frame page and in-line GIF and JPEG image files. The Page Renderer may need them in computing the layout of several HTML pages, so it is efficient to keep them in a local store rather than fetching these several times. Note that every page is not cached, just those pages that are used as child frames and those image files that are used in-line in pages.

Page Extractor 314*a*

Figure 7:
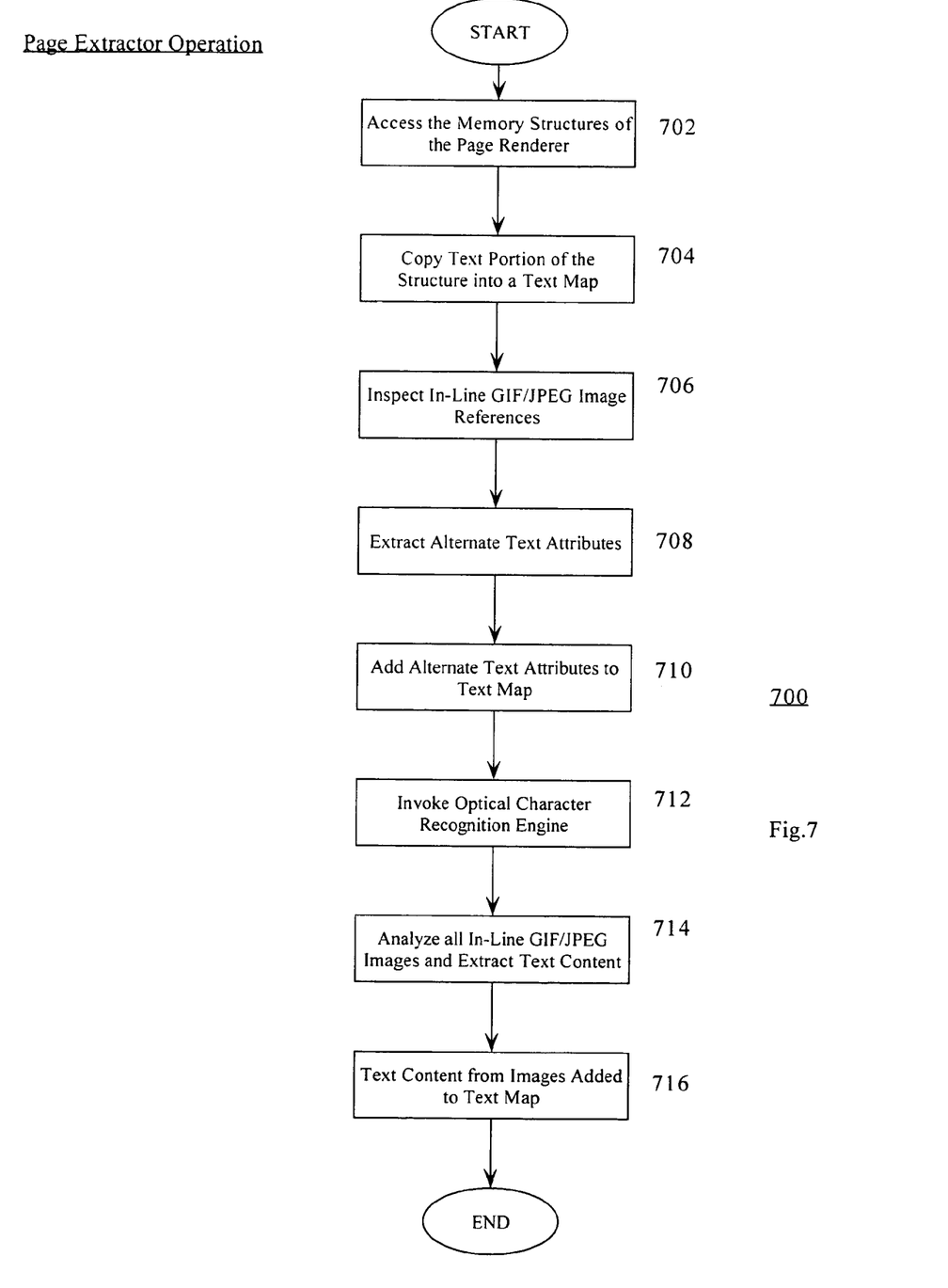
FIG. 7 is a flow diagram that illustrates the processing steps executed in a Page Extractor subroutine to extract embedded information from documents.

Be FIG. 7 is a flow diagram that illustrates the processing steps executed in a Page Extractor subroutine to extract embedded information from documents. This component is activated when the Page Renderer has finished rendering a HTML page. The Page Extractor has access to the memory structures of the Page Renderer 702. It first copies the contents of the text portion of the page into its own data structure 704, the Text Map. It then inspects in-line GIF and JPEG image references 706 and extracts the "alternate text" attributes 708 which typically describe the contents of an image (e.g. button or banner) in text form. These text attributes are also added 710 to the Text Map. Next, an optical character recognition engine is invoked 712 which analyzes all in-line GIF and JPEG images 714 and attempts to extract textual content from them. This text content is added to the Text Map 716.

Page Summarizer 316*a*

Figure 8:
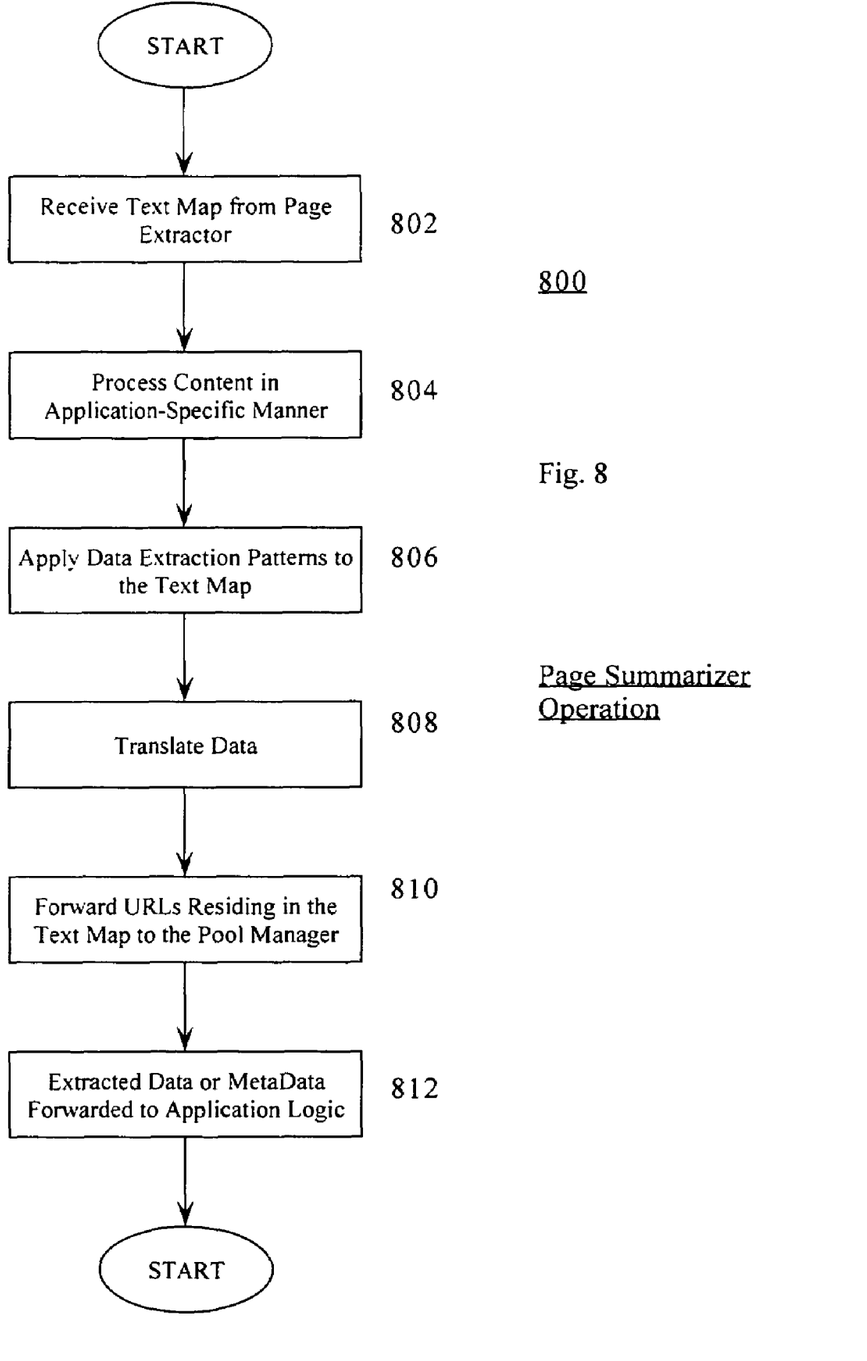
FIG. 8 is a flow diagram that illustrates the processing steps executed in a Page Summarizer subroutine to summarize data into metadata for forwarding to an application.

FIG. 8 is a flow diagram that illustrates the processing steps executed in a Page Summarizer subroutine to summarize data into metadata for forwarding to an application. The Page Summarizer receives the Text Map from the Page Extractor 802 and processes the content in an application-specific manner 804. For instance, a crawler for price data would apply data extraction patterns 806 to the Text Map and translate it into structured price data 808. URLs residing in the Text Map are given to 810 the Pool Manager for subsequent crawling. Extracted data and/or metadata are given to the application logic 812.

In this manner, an improved System and Method for Enhanced Browser Based Web Crawling has been described that overcomes the imperfections of the prior art. Now, web crawling will not be a faulty process that does not permit accurate retrieval of dynamic content and embedded image content. Rather, the use of browser technology integrated within the crawler in combination with the use of optical character recognition techniques disclosed herein allows for the accessing, retrieval and summarization of a whole and complete document free from any underlying software errors.

Discussion of Hardware and Software Implementation Options

The present invention, as would be known to one of ordinary skill in the art could be produced in hardware or software, or in a combination of hardware and software. The system, or method, according to the inventive principles as disclosed in connection with the preferred embodiment, may be produced in a single computer system having separate elements or means for performing the individual functions or steps described or claimed or one or more elements or means combining the performance of any of the functions or steps disclosed or claimed, or may be arranged in a distributed computer system, interconnected by any suitable means as would be known by one of ordinary skill in art.

According to the inventive principles as disclosed in connection with the preferred embodiment, the invention and the inventive principles are not limited to any particular kind of computer system but may be used with any general purpose computer, as would be known to one of ordinary skill in the art, arranged to perform the functions described and the method steps described. The operations of such a computer, as described above, may be according to a computer program contained on a medium for use in the operation or control of the computer, as would be known to one of ordinary skill in the art. The computer medium which may be used to hold or contain the computer program product, may be a fixture of the computer such as an embedded memory or may be on a transportable medium such as a disk, as would be known to one of ordinary skill in the art.

The invention is not limited to any particular computer program or logic or language, or instruction but may be practiced with any such suitable program, logic or language, or instructions as would be known to one of ordinary skill in the art. Without limiting the principles of the disclosed invention any such computing system can include, inter alia, at least a computer readable medium allowing a computer to read data, instructions, messages or message packets, and other computer readable information from the computer readable medium. The computer readable medium may include non-volatile memory, such as ROM, Flash memory, floppy disk, Disk drive memory, CD-ROM, and other permanent storage. Additionally, a computer readable medium may include, for example, volatile storage such as RAM, buffers, cache memory, and network circuits.

Furthermore, the computer readable medium may include computer readable information in a transitory state medium such as a network link and/or a network interface, including a wired network or a wireless network, that allow a computer to read such computer readable information.

What is claimed is:

1. A method for indexing dynamic data documents, the method comprising:

retrieving, to a server, with a web crawler from a network address, a dynamic data document with client-side scripting code therein;

executing, at the server, a web-browser, as part of the web crawler, wherein the web-browser renders an in-memory copy of the dynamic data document which has been retrieved, wherein the in-memory copy of the dynamic data document maintains a rendered web-browser display format and a rendered web-browser display layout of the dynamic data document when the web-browser renders the in-memory copy of the dynamic data document;

executing, at the server instead of a client system, a browser scripting engine as part of the web-browser, wherein the browser scripting engine executes the client-side scripting code and loads content as directed by the client-side scripting code into the in-memory copy creating a final web-browser display representation of the dynamic data document so that the final web-browser display representation is substantially similar to when the dynamic data document is rendered at a user's web-browser and viewed by a user in the user's web-browser running on the client system when all the dynamic data is viewed; and indexing, at the server, the content in the memory, wherein the content being indexed is the content which has been loaded by the browser scripting engine in order to index the dynamic data document as if being viewed by the user in the user's web-browser on the client system.

2. The method as defined in claim 1, wherein the content that is loaded into the in-memory copy comprises one or more images with textual content embedded therein including at least one of an in-line GIF image and an in-line JPEG image.

3. The method as defined in claim 1, wherein the executing a browser scripting engine as part of the web-browser for loading content as directed by the client-side scripting code into the in-memory copy further comprises executing on the server one or more Java applets with textual content embedded therein.

4. The method as defined in claim 3, wherein the executing a browser scripting engine as part of the web-browser for loading content as directed by the client-side scripting code into the in-memory copy further comprises executing on the server one or more Java Script components with textual content embedded therein.

5. The method as defined in claim 1, wherein the executing a browser scripting engine as part of the web-browser for loading content as directed by the client-side scripting code into the in-memory copy further comprises executing the client-side scripting code on the server which directs the loading of web documents selected from the group of documents consisting of in-line frames, frames, and equivalents.

6. The method as defined in claim 1, wherein the retrieving the dynamic data document further comprises performing the following sub-steps of:

initializing a first list with seed values;

checking if there are any URLs to be processed and in response that any URL exists to be processed then performing the following sub-steps of:

determining if a URL is in a second list; and in response that a URL is not in the second list then performing the following sub-steps of:

inserting the URL into the first list;

scheduling the URL for crawling;

crawling the URL when scheduled to do so;

removing the URL from the first list after the scheduled crawling;

entering the URL into the second list; and repeating the checking step until there are no more URLs to be processed;

where if the determining step determines that the URL is in the second list then repeating the checking step until there are no more URLs to be processed.

7. The method as defined in claim 6, wherein the sub-step of initializing a first list with seed values further includes the list being a URL pool.

8. The method as defined in claim 6, wherein the sub-step of determining if a URL is in a second list further includes the second list being a visited pool.

9. The method as defined in claim 6, wherein the sub-step of crawling further comprises the sub-steps of:

issuing an HTTP command to a web server named in the URL;

receiving contents of an HTML page as a result of the issued HTTP command; and passing on the contents of the HTML page to a Page Rendering subroutine.

10. The method as defined in claim 9, further including the sub-steps performed by the Page Rendering subroutine comprising:

receiving the contents of the HTML page in the Page Rendering subroutine;

building an in-memory copy of a web-browser layout for the HTML page and if more data is needed to properly form the copy, then performing the sub-steps of:

requesting additional web-based information;

gathering this additional web-based information;

inserting any URLs associated with this additional web-based information into the second list and a URL cache;

building a final amended in-memory copy; and forwarding the final amended in-memory copy to an Extraction subroutine;

wherein, if no more data is needed to properly form the in-memory representation, then forwarding the in-memory copy to the Extraction subroutine.

11. The method as defined in claim 10, further including the sub-steps performed by the Page Extraction subroutine comprising:

accessing a set of memory structures of the Page Renderer;

copying a text portion of the structures into a text map;

inspecting any in-line GIF and JPEG image references in the memory structures;

extracting alternate text attributes;

adding the alternate text attributes to a text map;

invoking an optical character recognition engine;

analyzing any in-line GIF and JPEG images using the optical character recognition engine for text content;

extracting text content from the GIF and JPEG images;

adding text content from the images to the text map; and forwarding the text map to a Page Summarizer subroutine.

12. The method as defined in claim 11, further including the sub-steps performed by the Page Summarizer subroutine comprising:

receiving a text map from the Page Extractor subroutine;

processing the text map in an application-specific manner;

applying data extraction patterns to the text map;

translating resultant data from the applying step;

forwarding any URLs present in the text map to a manager subroutine; and forwarding any extracted data and metadata to application logic.

13. The method of claim 1, wherein the indexing further comprises:

analyzing and summarizing, at the server, the final web-browser display representation of the dynamic data document to produce a text map for the dynamic data document; and using optical character recognition on the content that has been loaded into the in-memory copy to extract textual content for adding to the textual map for the dynamic data document.

* * * * *